(12) United States Patent
Yang et al.

(10) Patent No.: US 12,632,467 B2
(45) Date of Patent: May 19, 2026

(54) DATABASE SYSTEM, AND PRIMARY DATABASE ELECTION METHODS AND APPARATUSES

(71) Applicant: Beijing Oceanbase Technology Co., Ltd., Beijing (CN)

(72) Inventors: Zhenkun Yang, Hangzhou (CN); Hu Xu, Hangzhou (CN); Fusheng Han, Hangzhou (CN); Hao Liu, Hangzhou (CN)

(73) Assignee: Beijing Oceanbase Technology Co., Ltd., Beijing (CN)

( * ) Notice: Subject to any disclaimer, the term of this patent is extended or adjusted under 35 U.S.C. 154(b) by 0 days.

(21) Appl. No.: 18/873,692

(22) PCT Filed: Jul. 6, 2023

(86) PCT No.: PCT/CN2023/106126
§ 371 (c)(1),
(2) Date: Dec. 10, 2024

(87) PCT Pub. No.: WO2024/008156
PCT Pub. Date: Jan. 11, 2024

(65) Prior Publication Data
US 2025/0363129 A1     Nov. 27, 2025

(30) Foreign Application Priority Data
Jul. 8, 2022    (CN) .......................... 202210806745.1

(51) Int. Cl.
*G06F 16/00*          (2019.01)
*G06F 16/21*          (2019.01)
*G06F 16/27*          (2019.01)
(52) U.S. Cl.
CPC ............ *G06F 16/27* (2019.01); *G06F 16/217* (2019.01)

(58) Field of Classification Search
CPC ............................... G06F 16/27; G06F 16/217
See application file for complete search history.

(56) References Cited

U.S. PATENT DOCUMENTS

| | | | |
|---|---|---|---|
| 11,281,690 B1 * | 3/2022 | Smyk | ...................... G06F 16/27 |
| 2017/0032007 A1 | 2/2017 | Merriman | |

(Continued)

FOREIGN PATENT DOCUMENTS

| | | |
|---|---|---|
| CN | 106789197 A | 5/2017 |
| CN | 107995029 A | 5/2018 |

(Continued)

OTHER PUBLICATIONS

"International Search Report" regarding Intl. Application No. PCT/CN2023/106126, mailed on Oct. 17, 2023, pp. 1-10.

*Primary Examiner* — Alexander Khong
(74) *Attorney, Agent, or Firm* — Womble Bond Dickinson (US) LLP

(57)          ABSTRACT

This specification provides a database system, and primary database election methods and apparatuses. The system includes at least one auxiliary node and a plurality of clusters. If any cluster is a primary database of the first table and the other clusters are standby databases: the primary database applies to all auxiliary nodes and all clusters for extension of a term of the primary database during the current term, and if the primary database obtains more than half of approval votes before the current term ends, the primary database determines that the term of the primary database is successfully extended, otherwise, the primary database downgrades itself to a standby database; and the auxiliary node and/or the clusters that don't record the primary database of the first table in term initiate a distributed election, and elect a cluster that obtains more than half of approval votes as a new primary database.

12 Claims, 3 Drawing Sheets

(56) References Cited

U.S. PATENT DOCUMENTS

| 2018/0018198 | A1* | 1/2018 | Yang ..................... G06F 11/187 |
| 2021/0303160 | A1* | 9/2021 | Lieblich ................. G06F 3/067 |
| 2022/0067005 | A1* | 3/2022 | Krishnamurthy ... G06F 16/2365 |
| 2023/0095756 | A1* | 3/2023 | Wilkinson .......... H04L 63/1416 |
| | | | 726/6 |
| 2023/0128784 | A1* | 4/2023 | Zeltwanger ....... G06F 16/24568 |
| | | | 714/3 |

FOREIGN PATENT DOCUMENTS

| CN | 108984349 A | 12/2018 | |
| CN | 109063066 A * | 12/2018 | |
| CN | 113204424 A | 8/2021 | |
| CN | 113836222 A * | 12/2021 | ............. G06F 16/27 |
| CN | 115168322 A | 10/2022 | |
| TW | 1677797 B * | 11/2019 | ............. G06F 16/21 |
| WO | WO-2022061807 A1 * | 3/2022 | ........... G06F 16/275 |

* cited by examiner

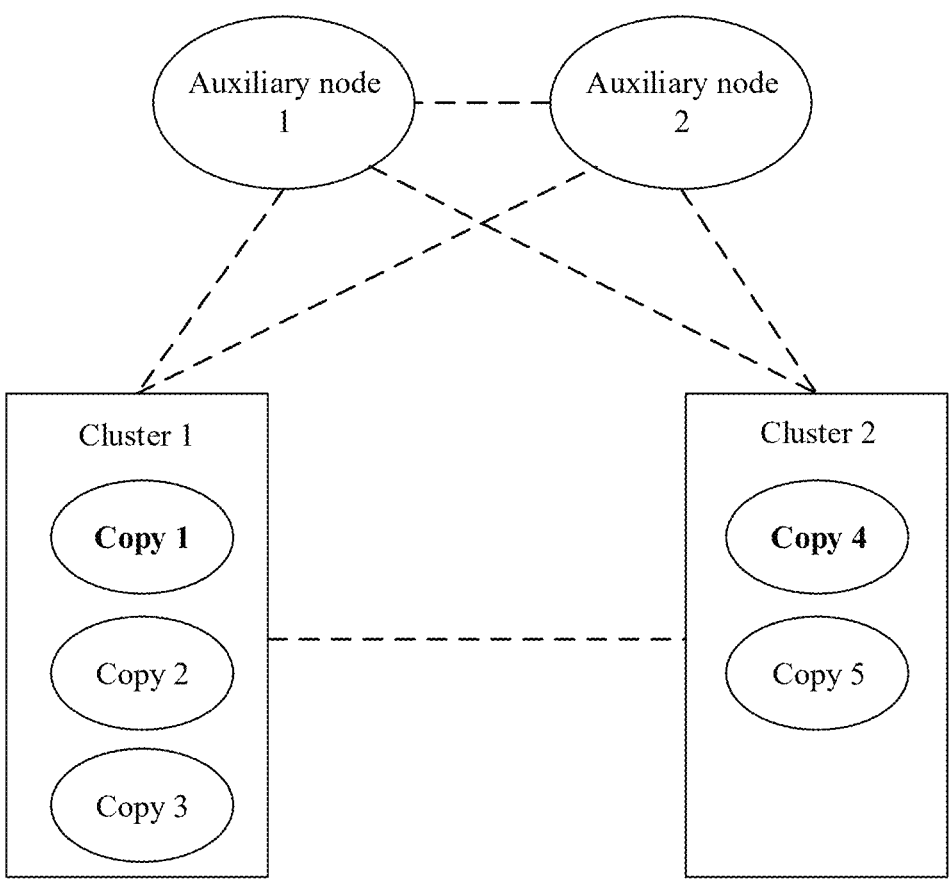

FIG. 3

If any cluster is a primary database of the first table and the other clusters are standby databases, initiate a distributed election for the primary database of the first table among auxiliary nodes and copies of the first table when it is determined that the auxiliary nodes and the copies of the first table do not record the primary database of the first table in term — 402

Elect a copy that obtains more than half of approval votes as a new primary database — 404

FIG. 4

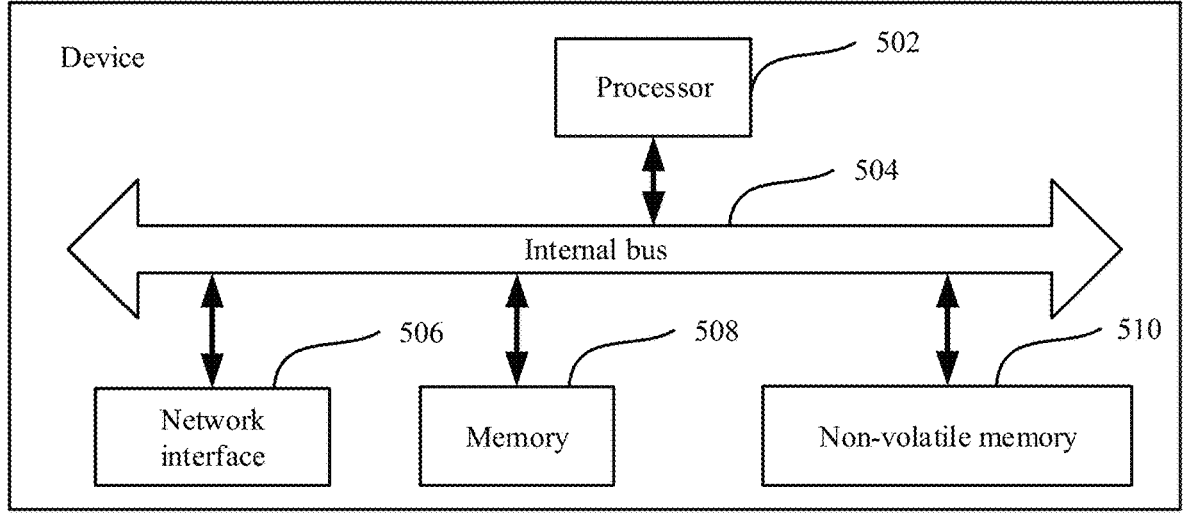
FIG. 5
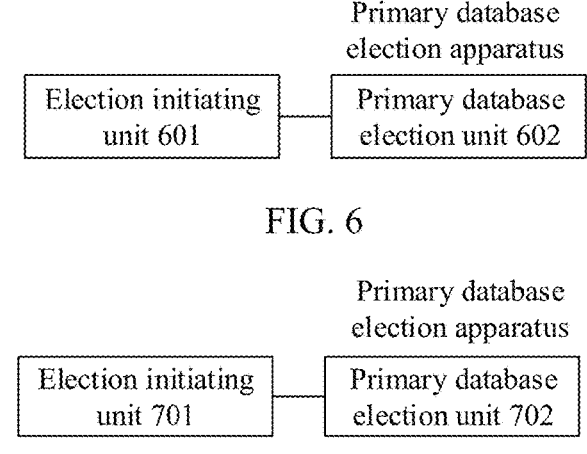
FIG. 6
Primary database
election apparatus
| Election initiating unit 701 | Primary database election unit 702 |
FIG. 7

DATABASE SYSTEM, AND PRIMARY DATABASE ELECTION METHODS AND APPARATUSES

CROSS-RELATED APPLICATIONS

This specification is a national stage entry of international application no. PCT/CN2023/106126, filed Jul. 6, 2023, which claims priority to Chinese Patent Application No. 202210806745.1, filed with the China National Intellectual Property Administration on Jul. 8, 2022, which is incorporated herein by reference in its entirety.

TECHNICAL FIELD

This specification belongs to the field of data storage technologies, and in particular, relates to a database system, and primary database election methods and apparatuses.

BACKGROUND

To improve the availability of a database system, a corresponding standby database (referred to as a standby database) is usually set for a primary database (referred to as a primary database) in the database system. In a running process of the database system, the primary database handles service flows. In the event of a failure or breakdown of the primary database, primary-standby switching can be performed, and the standby database takes over as a new primary database to handle the service flows.

In a related technology, the database system generally determines, by using a decision maker such as a monitoring node or an arbitration node, whether the primary database is abnormal, and then independently decides whether to perform primary-standby switching. However, because the monitoring node or arbitration node and a network between the monitoring node or arbitration node and the primary database may be abnormal, the status of the primary database cannot be accurately determined. This needs manual intervention by operation and maintenance personnel, which not only increases the workload of the operation and maintenance personnel but also makes it difficult to ensure high availability of the database system.

SUMMARY

The objective of this specification is to provide a database system, and primary database election methods and apparatuses.

According to a first aspect of one or more embodiments of this specification, a database system is provided, including at least one auxiliary node and a plurality of clusters. Each cluster includes data of at least one copy of a first table, and the auxiliary node does not include data of the first table. If any cluster is a primary database of the first table and the other clusters are standby databases: the primary database applies to all auxiliary nodes and all clusters for extension of a term of the primary database during the current term, and if the primary database obtains more than half of approval votes before the current term ends, the primary database determines that the term of the primary database is successfully extended, otherwise, the primary database downgrades itself to a standby database; and when the auxiliary node and/or the clusters determine that the auxiliary node and/or the clusters do not record the primary database of the first table in term, the auxiliary node and/or the clusters initiate a distributed election for the primary database of the first table among the auxiliary node and the clusters, and elect a cluster that obtains more than half of approval votes as a new primary database.

According to a second aspect of one or more embodiments of this specification, a database system is provided, including at least one auxiliary node and at least one cluster. Each cluster includes data of at least one copy of a first table, the first table has a plurality of copies in total, and the auxiliary node does not include data of the first table. If any copy of the first table is a primary database and the other copies are standby databases: the primary database applies to all auxiliary nodes and all copies for extension of a term of the primary database during the current term, and if the primary database obtains more than half of approval votes before the current term ends, the primary database determines that the term of the primary database is successfully extended, otherwise, the primary database downgrades itself to a standby database; and when the auxiliary node and/or the copies of the first table determine that the auxiliary node and/or the copies do not record the primary database of the first table in term, the auxiliary node and/or the copies of the first table initiate a distributed election for the primary database of the first table among the auxiliary node and the copies of the first table, and elect a copy that obtains more than half of approval votes as a new primary database.

According to a third aspect of one or more embodiments of this specification, a primary database election method is provided, applied to the auxiliary node and/or any cluster in the database system according to the first aspect. The method includes: if any cluster is a primary database of a first table and the other clusters are standby databases, initiating a distributed election for the primary database of the first table among the auxiliary node and clusters when it is determined that the auxiliary node and the clusters do not record the primary database of the first table in term; and electing a cluster that obtains more than half of approval votes as a new primary database.

According to a fourth aspect of one or more embodiments of this specification, a primary database election method is provided, applied to the auxiliary node and/or a copy of the first table in the database system according to the second aspect. The method includes: if any cluster is a primary database of the first table and the other clusters are standby databases, initiating a distributed election for the primary database of the first table among the auxiliary node and copies of the first table when it is determined that the auxiliary node and the copies of the first table do not record the primary database of the first table in term; and electing a copy that obtains more than half of approval votes as a new primary database.

According to a fifth aspect of one or more embodiments of this specification, a primary database election apparatus is provided, applied to the auxiliary node and/or any cluster in the database system according to the first aspect. The apparatus includes: an election initiating unit, configured to initiate a distributed election for a primary database of a first table among the auxiliary node and the clusters when it is determined that the auxiliary node and the clusters do not record the primary database of the first table in term; and a primary database election unit, configured to elect a cluster that obtains more than half of approval votes as a new primary database.

According to a sixth aspect of one or more embodiments of this specification, a primary database election apparatus is provided, applied to the auxiliary node and/or a copy of the first table in the database system according to the second aspect. The apparatus includes: an election initiating unit, configured to initiate a distributed election for a primary database of the first table among the auxiliary node and copies of the first table when it is determined that the auxiliary node and the copies of the first table do not record the primary database of the first table in term; and a primary database election unit, configured to elect a copy that obtains more than half of approval votes as a new primary database.

According to a seventh aspect of one or more embodiments of this specification, an electronic device is provided, including: a processor; and a memory configured to store processor-executable instructions, where the processor runs the executable instructions to implement the method according to either of the third aspect and the fourth aspect.

According to an eighth aspect of one or more embodiments of this specification, a computer-readable storage medium is provided, where the computer-readable storage medium stores computer instructions, and the instructions are executed by a processor to implement the steps of the method according to either of the third aspect and the fourth aspect.

In the above solution, the database system further includes, in addition to a plurality of clusters, at least one auxiliary node, where each cluster includes data of at least one copy of a first table, and the auxiliary node does not include data of the first table. When any cluster is the primary database of the first table and the other clusters are standby databases, the primary database applies to all auxiliary nodes and all clusters (or copies) for extension of a term of the primary database during the current term; and if the primary database obtains more than half of approval votes before the current term ends, the primary database determines that the term of the primary database is successfully extended, otherwise, the primary database downgrades itself to a standby database. Accordingly, when the auxiliary node and/or the clusters (or copies) determine that the auxiliary node and/or the clusters (or copies) do not record the primary database of the first table in term, the auxiliary node and/or the clusters (or copies) can initiate a distributed election for the primary database of the first table among the auxiliary node and all the clusters (or copies), and elect a cluster that obtains more than half be of approval votes as a new primary database.

It can be learned that in this solution, at least one auxiliary node that does not include the data of the first table is introduced into the database system, the above-mentioned auxiliary node participates in the distributed election for the primary database of the first table, and then a cluster (or copy) that obtains more than half of approval votes is elected as a new primary database. Because the above-mentioned distributed election is initiated among the auxiliary node and all the clusters (or copies), each auxiliary node and each cluster (or copy) that receive the election in the database system participate in voting, and a finally elected new primary database is determined based on a joint voting result of each auxiliary node and each cluster (or copy). It can be learned that the new primary database is a result of a joint decision of each auxiliary node and each cluster (or copy) in the database system, rather than an independent decision of either party.

In this solution, when a certain cluster (or copy) obtains more than half of approval votes, the cluster (or copy) can be automatically and quickly determined as a new primary database without manual intervention by operation and maintenance personnel, which reduces labor costs and improves decision-making efficiency. In addition, even when a certain party is abnormal, the remaining parties can jointly determine a new primary database through the above-mentioned voting process, which helps achieve high availability of the database system.

BRIEF DESCRIPTION OF DRAWINGS

To describe the technical solutions in this specification more clearly, the following briefly describes the accompanying drawings needed for describing the embodiments. Clearly, the accompanying drawings in the following descriptions show merely some embodiments of this specification, and a person of ordinary skill in the art can still derive other drawings from these accompanying drawings without creative efforts.

FIG. 3 is a schematic structural diagram illustrating another blockchain system, according to some example embodiments;

FIG. 4 is a flowchart illustrating another primary database election method, according to some example embodiments;

FIG. 5 is a schematic structural diagram illustrating a device, according to some example embodiments;

FIG. 6 is a block diagram illustrating a primary database election apparatus, according to some example embodiments; and FIG. 7 is a block diagram illustrating another primary database election apparatus, according to some example embodiments.

DESCRIPTION OF EMBODIMENTS

Figure 1:
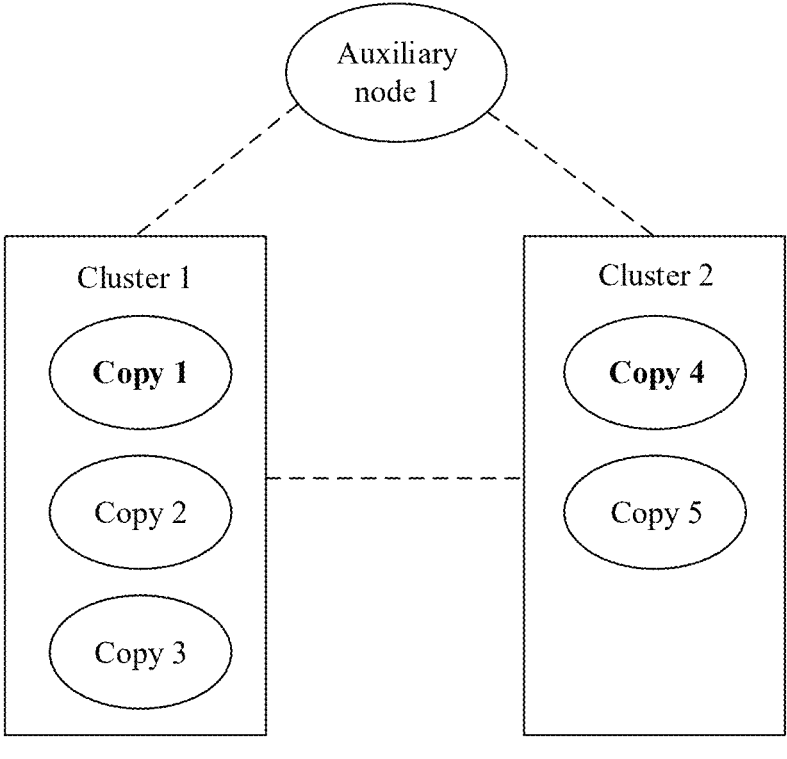
FIG. 1 is a schematic structural diagram illustrating a blockchain system, according to some example embodiments.

To make a person skilled in the art better understand the technical solutions in this specification, the following clearly and comprehensively describes the technical solutions in this specification with reference to the accompanying drawings in this specification. Clearly, the described embodiments are merely some but not all of the embodiments of this specification. All other embodiments obtained by a person of ordinary skill in the art based on the embodiments of this specification without creative efforts shall fall within the protection scope of this specification.

The database system described in this specification includes a database cluster (hereinafter referred to as a cluster) and at least one auxiliary node, where the cluster includes data of at least one copy of a first table, and the auxiliary node does not include the data. At any moment, any cluster or any copy in the database system may be a primary database of the first table (in this case, other clusters or copies are standby databases of the first table), and the primary database has a corresponding term. During the term of the primary database, the primary database can receive a service request, and modify, in response to the service request, the data of the first table maintained by the primary database. In addition, the primary database can further instruct each standby database to separately perform the same modification on local data of the first table, so that the data of the first table are consistent between the primary database and the standby databases, even if each copy of the first table separately stores the same data of the first table.

The "copy" described in this specification is a "copy database" in the database system; and the cluster can be a distributed cluster, i.e. each copy can be a copy that is deployed in a distributed way. In addition, the first table is a data table maintained by the database system, the first table can be any table, or the table can be a predefined specific table. The first table can be determined based on a specific situation of data maintained by the database system, and details are omitted for simplicity. A predefined specific table is used as an example. Data tables maintained by the database system can be classified based on at least one dimension such as a type (e.g., a data type or a service type), a field, a tenant, or a data operation frequency, and a classified table of a certain type is used as the first table. In addition, the data of the first table can be any service data generated when a service system connected to the database system runs, or can be data synchronized from another database system, which is not limited in this specification.

As described above, the auxiliary node in the database system does not include the data of the first table. In this specification, any auxiliary node in the database system is configured to participate in a distributed election without participating in modifying the data of the first table. In other words, in the solutions described in this specification, an auxiliary node that does not include the data of the first table is introduced into the database system, and the auxiliary node participates in the distributed election in the database system. Certainly, the solutions in this specification are only for the first table, any auxiliary node can include data of another table other than the first table, or cannot include data of any table, which is not limited in this specification.

The primary database election solution described in this specification can be implemented by using paxos, raft, or another distributed election algorithm. A specific algorithm is not limited in this specification. In an implementation process of the primary database election solution, it can be assumed by default that all participants adhere to a principle of not acting maliciously, i.e., it is assumed by default that both an initiator and a voter of an election are honest, and there is no malicious party. It is hereby stated that if the auxiliary node receives any distributed election initiated by any initiator, the auxiliary node can unconditionally trust that the initiator initiates the distributed election based on real information obtained by the auxiliary node, i.e., the distributed election is trustworthy.

In a running process of the database system, each cluster can participate as a whole in voting for the distributed election, i.e., each cluster acts as a voter. Alternatively, each copy in the system can participate in the voting for the distributed election, i.e., each copy acts as a voter. For the above-mentioned two scenarios, this specification provides two database systems and corresponding primary database election methods respectively. The following descriptions are provided with reference to the accompanying diagrams. Scenario 1: Each Cluster Acts as a Voter In this scenario, the database system includes at least one auxiliary node and a plurality of clusters. Each cluster includes data of at least one copy of a first table, and the auxiliary node does not include data of the first table. If any cluster is a primary database of the first table and the other clusters are standby databases: the primary database applies to all auxiliary nodes and all clusters for extension of a term of the primary database during the current term, and if the primary database obtains more than half of approval votes before the current term ends, the primary database determines that the term of the primary database is successfully extended, otherwise, the primary database downgrades itself to a standby database; and when the auxiliary node and/or the clusters determine that the auxiliary node and/or the clusters do not record the primary database of the first table in term, the auxiliary node and/or the clusters initiate a distributed election for the primary database of the first table among the auxiliary node and the clusters, and elect a cluster that obtains more than half of approval votes as a new primary database.

As shown in FIG. 1, the database system includes one auxiliary node and two clusters, i.e., assist 1, cluster 1, and cluster 2, cluster 1 is a primary database of the first table at the current moment, and cluster 2 is a standby database of the first table at the current moment. Cluster 1 includes three copies of the first table, i.e., copies 1~3; and cluster 2 includes two copies of the first table, i.e., copies 4~5. It can be learned that at a logical level, copies 1~3 constitute cluster 1, and copies 4~5 constitute cluster 2. However, at a physical level, the above-mentioned copies can be respectively deployed in distributed storage devices, and a storage device in which any copy is located can be an independent physical device, or can be a virtual storage device, a cloud storage device, etc. carried by a host cluster. Details are omitted for simplicity. In addition, FIG. 1 shows only one auxiliary node assist 1. In solution practice, one or more auxiliary nodes can be disposed based on an actual requirement. Details are not omitted for simplicity.

A primary copy of any cluster can be obtained through negotiation between copies of the cluster, and the primary copy can form a logical relationship of a "primary-standby" structure with the other copies in the cluster, so that the primary copy controls the other copies in a running process of the cluster. For example, in cluster 1, copy 1 is a primary copy, and copies 2 and 3 are standby copies. In this case, a service request can be received by copy 1. Further, copy 1, on the one hand, can modify local data of the first table maintained by copy 1, and on the other hand, can instruct copies 2 and 3 in cluster 1 and copies 4 and 5 in cluster 2 to perform the same modification. Alternatively, copy 1 can represent cluster 1 to participate in a distributed election initiated in the database system by any auxiliary node or any cluster. Similarly, in cluster 2, copy 4 is a primary copy, and copy 5 is a standby copy. In this case, copy 4 can represent cluster 2 to participate in the distributed election initiated in the database system by any auxiliary node or any cluster. Details are omitted for simplicity. In addition, to ensure that a majority and a corresponding minority of a voting result of any distributed election initiated in the database system can be formed, to intuitively determine the voting result, a quantity of votes of each auxiliary node and each cluster can be reasonably set. For example, when the database system includes two clusters and one auxiliary node, a quantity of votes of the auxiliary node and each cluster can be reasonably set, so that a total quantity of votes owned by any two of the clusters and the auxiliary node exceeds half. As shown in FIG. 1, the quantities of votes of the assist, cluster 1, and cluster 2 can be set to be equal (e.g., each of the three has one vote). In this case, for any distributed election, a majority can be formed when any two parties have the same opinion, to ensure the validity of the voting result.

It is worthwhile to note that a network connection exists between the auxiliary node and the clusters. For example, a network connection can exist between the clusters, and certainly, a network connection can also exist between the copies in any cluster, so that a corresponding network connection exists between the copies in the database system. Each copy in any cluster can interact with another database cluster or another auxiliary node, or can interact with another database cluster or another auxiliary node through a primary copy in the cluster. This is not limited in this specification.

FIG. 1 is used as an example. As a primary database of the first table at the current moment, cluster 1 can apply to the auxiliary node and all clusters for extension of a term of cluster 1 during the current term. For example, cluster 1 can initiate a term extension proposal for a primary database identity of cluster 1 to each of the auxiliary node and cluster 2 at any moment before the current term ends. When the proposal is received, assist 1 and/or cluster 2 can respectively return voting messages indicating their opinions (approval or rejection) to cluster 1 (if the opinions can be represented by values of intent fields in the messages), so that cluster 1 can determine, based on the voting messages, whether the senders of the messages approve or reject the term extension proposal. Alternatively, when the term extension proposal is received, assist 1 can return a corresponding voting message when approving the proposal and return no message when rejecting the proposal. Cluster 2 is similar to this, and details are omitted for simplicity. Correspondingly, cluster 1 can determine a corresponding quantity of approval votes based on the received voting message. It can be understood that, because cluster 1 is the initiator of the term extension proposal, cluster 1 naturally approve the extension of the term of cluster 1 (i.e., there is at least one approval vote for the term extension proposal), which is equivalent to that the term extension proposal is further used to instruct cluster 1 to approve the proposal. Therefore, if cluster 1 receives an approval vote from at least one of the auxiliary node and cluster 2 before the current term ends, it can be determined that cluster 1 obtains more than half of approval votes, so that it can be determined that the term of cluster 1 is successfully extended. Thereafter, cluster 1 can continue to act as the primary database of the first table. Otherwise, if cluster 1 does not receive any approval vote (e.g., receiving two rejection votes, receiving one rejection vote without receiving an approval vote, receiving no vote message, etc.) before the current term ends, it can be determined that cluster 1 does not receive more than half of approval votes, and then it can be determined that the extension of the term of cluster 1 fails. After the current term ends, cluster 1 can downgrade itself to a standby database of the first table.

The above-mentioned way in which the term of the cluster is extended by initiating a term extension proposal is only one term extension way that can be used by cluster 1. In a solution implementation process, the term of cluster 1 can also be extended in a way of sending a heartbeat message based on a fixed period, monitoring the current term and actively initiating a term extension message by each auxiliary node or each standby database, etc. Details are omitted for simplicity.

In some embodiments, when a modification request for the first table is received, the primary database can modify local data of the first table according to the modification request. In addition, the primary database can further synchronize a modification log corresponding to the above-mentioned modification to each standby database, so that each standby database separately modifies the local data of the first table according to the modification log. As described above, both the primary database and the standby database are clusters in the database system, and any cluster includes at least one copy of the first table. Based on this, the local data of the first table modified by any cluster is data of the first table separately maintained by each copy in the cluster. Specifically, the local data maintained by each copy can be separately modified by the copy. As shown in FIG. 1, copies 1~3 in cluster 1 and copies 4~5 in cluster 2 can respectively modify the local data of the first table maintained by themselves, where copy 1 can perform modification in response to the modification request, copies 4~5 can perform modification in response to a modification log delivered by copy 1, and copies 2 and 3 can perform modification in response to the modification request or can perform modification based on the modification log delivered by copy 1. Details are omitted for simplicity. The modification performed by any cluster can be an operation such as adding, deleting, or modifying the local data, which is not limited in this specification.

As described above, the auxiliary node and/or the clusters can initiate a distributed election for the primary database of the first table when it is determined that the auxiliary node and/or the clusters do not record the primary database of the first table in term. For example, the auxiliary node and/or the clusters can determine, when information about the primary database of the first table is not recorded by the auxiliary node and/or the clusters, that the auxiliary node and/or the clusters do not record the primary database in term. The auxiliary node is used as an example. When the auxiliary node is just started, the auxiliary node may not have recorded the information about the primary database of the first table locally. In this case, the auxiliary node can initiate a distributed election for the primary database of the first table, to trigger the auxiliary node and each cluster to participate in electing the primary database of the first table. As such, the auxiliary node or the clusters can trigger the election of the primary database immediately after being started, so that the database system can start normal running as soon as possible. Certainly, if the primary database has been elected by another participant when any auxiliary node or cluster is started, the auxiliary node or cluster can synchronize the information about the primary database at the current moment from the another participant, to start to participate in running of the database system.

For another example, after the primary database of the first table is determined through election, the auxiliary node and the clusters can separately maintain corresponding information about the primary database. The information about the primary database can include term information of the primary database, such as duration of the current term and an end moment. The information about the primary database can further include information such as a cluster identifier of the primary database, a copy identifier of each copy in the primary database, and a network address. Details are omitted for simplicity. Based on this, the auxiliary node and/or the clusters can also determine, when the information about the primary database of the first table recorded by the auxiliary node and/or the clusters indicates that the term of the primary database has ended, that the auxiliary node and/or the clusters do not record the primary database of the first table in term. For example, when the end moment in the information about the primary database is earlier than the current moment, it can be determined that the term of the primary database has ended. As such, the auxiliary node and/or clusters can trigger an election of a new primary database when the current primary database expires, so that the database system resumes normal running as soon as possible.

The above-mentioned distributed election can be initiated by the primary database or any standby database when the current term of the primary database ends, or can be initiated by the primary database or any standby database when it is perceived that the primary database is abnormal. Based on the above-mentioned embodiments, if cluster 1 in FIG. 1 is the primary database and the current term of cluster 1 has ended, cluster 1 can downgrade itself to a standby database. Further, cluster 1 can initiate a distributed election for the primary database of the first table to cluster 2 and assist 1 when determining that the term of cluster 1 has ended and a new primary database has not been determined. Alternatively, cluster 2 can initiate a distributed election for the primary database of the first table to cluster 1 and assist 1 when perceiving that the current term of cluster 1 has ended and a new primary database has not been determined.

When the above-mentioned distributed election is initiated by any cluster (i.e., the primary database or any standby database), specifically, the distributed election can be initiated by a primary copy in the any cluster. For example, copy 1 can represent cluster 1 to initiate a distributed election for the primary database of the first table to assist 1 and cluster 2 when the current term of cluster 1 ends, where the distributed election can be initiated when a distributed election initiated by assist 1 or cluster 2 is not received, to avoid conflicts or repeated initiation of distributed elections for the primary database of the same table. For another example, copy 4 can represent cluster 2 to initiate a distributed election for the primary database of the first table to the auxiliary node and cluster 1 when the current term of cluster 1 ends. A specific process is omitted for simplicity. Any distributed election initiated by any cluster for the primary database of the first table can be used to indicate that a certain cluster is approved to act as the primary database of the first table, and the certain cluster can be the any cluster itself, or can be a predetermined default cluster. This is not limited in this specification.

An example in which copy 4 (i.e., the primary copy of the cluster) represents cluster 2 (a standby database in this case) to initiate a distributed election for the primary database of the first table is used for description. In some example embodiments, copy 4 can represent cluster 2 to initiate a first primary database election proposal to assist 1 and cluster 1. The proposal can be used to indicate that cluster 2 approves to elect a certain cluster as a new primary database which is then configured to trigger assist 1 to submit a voting message for the proposal, and trigger copy 1 (i.e., a primary copy of cluster 1) to represent cluster 1 to submit a voting message for the proposal. It can be learned that the above-mentioned first primary database election proposal can be considered as an approval vote of cluster 2 for the proposal. The "certain cluster" indicated by the first primary database election proposal can be cluster 1 or cluster 2 specified in the proposal by copy 4, or can be a predetermined default cluster (the default cluster can be any cluster in the database system), which is not limited in this specification. Accordingly, after receiving the first primary database election proposal, assist 1 can submit a voting message for the proposal; and after cluster 2 receives the first primary database election proposal, copy 4 can represent cluster 2 to submit a voting message for the proposal. The voting message submitted by any of the above-mentioned participants can be used to indicate whether the participant approves the first primary database election proposal, so that a receiver counts a voting result of the first primary database election proposal based on the received voting message, and further determines whether a cluster designated by the first primary database election proposal is elected as a new primary database. Any participant can submit the voting message to the initiator of the first primary database election proposal, or can separately submit the voting message to each participant (i.e., the auxiliary node and all clusters, rather than the any participant, that participate in voting for the proposal) of the first primary database election proposal. Details are omitted for simplicity. As such, cluster 1, cluster 2, and assist 1 participate separately as a whole in the voting for the first primary database election proposal, and fewer participants make a voting and result statistics process relatively simple, which helps quickly and efficiently determine a new primary database.

Certainly, because assist 1 and cluster 1 may be abnormal (e.g., a connection from at least one of assist 1 and cluster 1 to cluster 2 is disconnected, or the at least one of assist 1 and cluster 1 fails or even breaks down), the auxiliary node and cluster 1 may not be able to successfully receive the first primary database election proposal initiated by cluster 2. It is hereby stated that based on this, the above-mentioned description "cluster 2 initiates a first primary database election proposal to assist 1 and cluster 1" should be understood as "cluster 2 attempts to initiate a first primary database election proposal to assist 1 and cluster 1", and any one of assist 1 and cluster 1 can attempt to participate in the voting for the proposal in the above-mentioned way when the proposal is received.

As such, a certain cluster can be elected from the plurality of clusters included in the database system as a new primary database. Thereafter, the cluster can upgrade itself to the primary database of the first table, and the other clusters correspondingly become standby databases of the first table. Thereafter, the primary database can receive a read/write request for the first table, so that the primary database performs a corresponding read/write operation, in response to the read/write request, on data of the first table maintained by the primary database. When the read/write request is a modification request for the data, the primary database can further synchronize a modification log corresponding to the request to each standby database, so that each standby database performs the same modification operation as that of the primary database on local data of the first table maintained by the standby database. Details are omitted for simplicity.

It can be understood that, when the elected new primary database and the primary database before the election are the same cluster (e.g., the new primary database elected after the term of cluster 1 ends is still cluster 1), the cluster can continue to act as the primary database of the first table to participate in running of the database system; and when the elected new primary database and the primary database before the election are different clusters (e.g., cluster 2 is elected as a new primary database after the term of cluster 1 ends), the new primary database is a standby database before being elected. Therefore, the cluster needs to first upgrade itself to a primary database and then acts as a new primary database to participate in the running of the database system. In fact, a process of upgrading the cluster to the new primary database is a primary-standby switching process for the first table, i.e., the original primary database is downgraded to a standby database and a certain original standby database (i.e., the elected primary database) is upgraded to a new primary database. As such, primary-standby switching for the first table can be implemented.

Similar to the above-mentioned description that the primary database is abnormal, the standby database or the auxiliary node in the database system can also be abnormal, e.g., any standby database or the auxiliary node may have an abnormality such as a communication failure, a log lag, or even a breakdown. When it is perceived that any participant is abnormal, to maintain normal running of the database system, the other participants can initiate an election to enable the abnormal participant to go offline. For example, when determining that any standby database is abnormal, the primary database and/or the auxiliary node can initiate a distributed election for the standby database, and mark the running state of the any standby database as offline when a quantity of approval votes for the election exceeds half. As shown in FIG. 1, assist 1 can attempt to separately initiate a standby database offline proposal for cluster 2 to cluster 1 and cluster 2 when it is perceived that cluster 2 is abnormal. Correspondingly, cluster 1 can return a voting message for the proposal to the standby database when the standby database offline proposal is received, to inform cluster 1 of an attitude of cluster 1 (approval or rejection) for the proposal. Certainly, if the standby database offline proposal is successfully received, cluster 2 can return a corresponding voting message to assist 1. In addition, assist 1 can count a quantity of approval votes for the proposal based on the content of the received voting messages and a quantity of the voting messages, and mark the locally recorded running state of cluster 2 as offline when the quantity of approval votes exceeds half. Similarly, cluster 1 can mark the running state of cluster 2 as offline. Details are omitted for simplicity.

For another example, when determining that any auxiliary node is abnormal, the primary database and/or the standby databases can initiate a distributed election for the auxiliary node, and mark the running state of the any auxiliary node as offline when a quantity of approval votes for the election exceeds half. As shown in FIG. 1, cluster 1 can attempt to separately initiate an auxiliary node offline proposal for assist 1 to assist 1 and cluster 2 when it is perceived that assist 1 is abnormal. Correspondingly, cluster 2 can return a voting message for the proposal to cluster 1 when the auxiliary node offline proposal is received, to inform cluster 1 of an attitude of cluster 2 (approval or rejection) for the proposal. Certainly, if the auxiliary node offline proposal is successfully received, assist 1 can return a corresponding voting message to cluster 1. In addition, cluster 1 can count a quantity of approval votes for the proposal based on the content of the received voting messages and a quantity of the voting messages, and mark the running state of the auxiliary node as offline when the quantity of approval votes exceeds half. Similarly, cluster 2 can mark the running state of assist 1 as offline. Details are omitted for simplicity.

Any auxiliary node or any cluster in the database system locally maintains the running states of each auxiliary node and each cluster. Based on this, the any standby database or any auxiliary node is marked as offline, i.e., the locally maintained running state of the any standby database or any auxiliary node is updated to an offline state. If any standby database is marked as offline, the primary database can thereafter avoid synchronizing a modification log to the standby database when modifying the data for the first table, and the auxiliary node and the other clusters can thereafter avoid initiating a distributed election to the standby database, so that each copy included in the cluster does not participate in voting for the distributed election. For another example, if any auxiliary node is marked as offline, the clusters in the database system can avoid initiating a distributed election to the auxiliary node, so that the auxiliary node does not participate in voting for the distributed election. As such, the offline cluster or auxiliary node can stop participating in the running of the database system for related affairs of the first table, to avoid causing interference to the primary database and the other normal standby databases, thereby ensuring normal running of the database system.

Certainly, after being restored to normal, the offline cluster or auxiliary node can initiate an election to come back online, to continue to participate in running of the blockchain system. For example, when any offline cluster determines that it is restored to normal, the any offline cluster can initiate a cluster restoration proposal for the cluster to the other clusters and auxiliary nodes, participate in voting for the proposal, and further, when it is determined that more than half of approval votes are obtained, mark the locally maintained running state of the cluster as online. Similarly, the auxiliary nodes and the other clusters that participate in the voting can also mark the locally maintained running state of the any cluster as online. After the above-mentioned running state is marked, the any cluster is restored to a normal cluster in the database system, and thereafter can participate in the normal running of the database system. Similarly, when any offline auxiliary node determines that it is restored to normal, the offline auxiliary node can initiate an auxiliary node restoration proposal for the auxiliary node to the other auxiliary nodes and clusters, participate in voting for the proposal, and further, when it is determined that more than half of approval votes are obtained, mark the locally maintained running state of the auxiliary node as online. Similarly, the other auxiliary nodes and clusters that participate in voting can also mark the locally maintained running state of the any auxiliary node as online. After the above-mentioned running state is marked, the any auxiliary node is restored to a normal auxiliary node in the database system, and thereafter can participate in the normal running of the database system.

Figure 2:
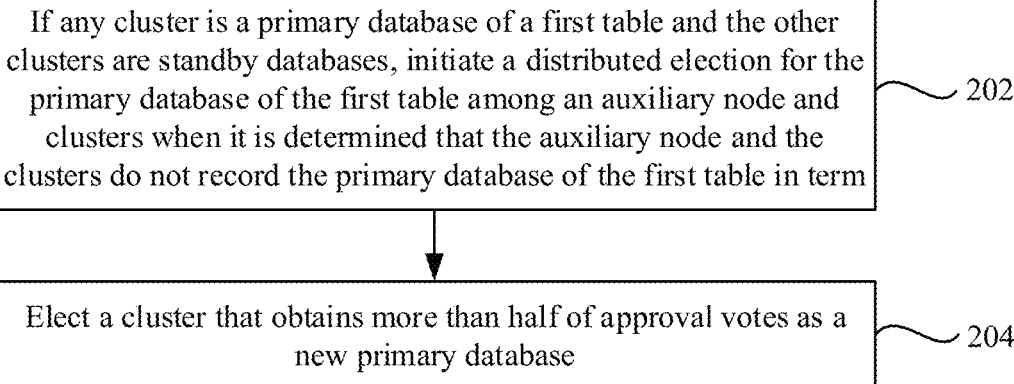
FIG. 2 is a flowchart illustrating a primary database election method, according to some example embodiments.

Corresponding to the database system described in the embodiments of scenario 1, this specification further provides a primary database election method. Refer to FIG. 2, a flowchart illustrating a primary database election method. As shown in FIG. 2, the method can be applied to the auxiliary node and/or any cluster in the database system in any embodiment of scenario 1, and the method includes steps 202-204.

Step 202: If any cluster is a primary database of a first table and the other clusters are standby databases, initiate a distributed election for the primary database of the first table among the auxiliary node and clusters when it is determined that the auxiliary node and the clusters do not record the primary database of the first table in term.

Step 204: Elect a cluster that obtains more than half of approval votes as a new primary database.

For a specific implementation process of steps 202-204, refer to the detailed descriptions in the embodiments of the database system in scenario 1. Details are omitted here for simplicity.

In the above-mentioned embodiment, the database system includes, in addition to a plurality of clusters, at least one auxiliary node, where each cluster includes data of at least one copy of the first table, and the auxiliary node does not include data of the first table. When any cluster is the primary database of the first table and the other clusters are standby databases, the primary database applies to all auxiliary nodes and all clusters for extension of a term of the primary database during the current term; and if the primary database obtains more than half of approval votes before the current term ends, the primary database determines that the term of the primary database is successfully extended, otherwise, the primary database downgrades itself to a standby database. Accordingly, when the auxiliary node and/or the clusters determine that the auxiliary node and/or the clusters do not record the primary database of the first table in term, the auxiliary node and/or the clusters can initiate a distributed election for the primary database of the first table among the auxiliary node and all the clusters, and elect a cluster that obtains more than half be of approval votes as a new primary database.

It can be learned that in this solution, at least one auxiliary node that does not include the data of the first table is introduced into the database system, the above-mentioned auxiliary node participates in the distributed election for the primary database of the first table, and then a cluster that obtains more than half of approval votes is elected as a new primary database. Because the above-mentioned distributed election is initiated among the auxiliary node and all the clusters, each auxiliary node and each cluster that receive the election in the database system participate in voting, and a finally elected new primary database is determined based on a joint voting result of each auxiliary node and each cluster. It can be learned that the new primary database is a result of a joint decision of each auxiliary node and each cluster in the database system, rather than an independent decision of either party. In the above-mentioned solution, when a certain cluster obtains more than half of approval votes, the cluster can be automatically and quickly determined as a new primary database without manual intervention by operation and maintenance personnel, which reduces labor costs and improves decision-making efficiency. In addition, even when a certain party is abnormal, the remaining parties can jointly determine a new primary database through the above-mentioned voting process, which helps achieve high availability of the database system.

Scenario 2: Each Copy Acts as a Voter

In this scenario, the database system includes at least one auxiliary node and at least one cluster. Each cluster includes data of at least one copy of a first table, the first table has a plurality of copies in total, and the auxiliary node does not include data of the first table. If any copy of the first table is a primary database and the other copies are standby databases: the primary database applies to all auxiliary nodes and all copies for extension of a term of the primary database during the current term, and if the primary database obtains more than half of approval votes before the current term ends, the primary database determines that the term of the primary database is successfully extended, otherwise, the primary database downgrades itself to a standby database; and when the auxiliary node and/or the copies of the first table determine that the auxiliary node and/or the copies do not record the primary database of the first table in term, the auxiliary node and/or the copies of the first table initiate a distributed election for the primary database of the first table among the auxiliary node and the copies of the first table, and elect a copy that obtains more than half of approval votes as a new primary database.

It can be understood that in this scenario, each auxiliary node and each copy in the database system are participants of the distributed election for the first table. To ensure that the database system includes both a primary database and a standby database at any moment, the first table has a plurality of copies in total. Specifically, when the database system includes one cluster, the cluster includes a plurality of copies of the first table; and when the database system includes a plurality of clusters, any cluster can include at least one copy of the first table.

As shown in FIG. 3, the database system includes two auxiliary nodes and two clusters, i.e., assists 1~2 and clusters 1~2, cluster 1 is a primary database of the first table at the current moment, and cluster 2 is a standby database of the first table at the current moment. The situation of copies included in cluster 1 and cluster 2 is similar to that in FIG. 1. Details are omitted here for simplicity.

Similar to scenario 1, a primary copy of any cluster can be obtained through negotiation between copies of the cluster, and the primary copy can form a logical relationship of a "primary-standby" structure with the other copies in the cluster, so that the primary copy controls the other copies in a running process of the cluster. For example, in cluster 1, copy 1 is a primary copy, and copies 2 and 3 are standby copies. In this case, a service request can be received by copy 1. Further, copy 1, on the one hand, can modify local data of the first table maintained by copy 1, and on the other hand, can instruct copies 2 and 3 in cluster 1 and copies 4 and 5 in cluster 2 to perform the same modification. Alternatively, copy 1 can trigger copies 2 and 3 to participate in a distributed election initiated in the database system by a copy in any auxiliary node or cluster 2. Similarly, in cluster 2, copy 4 is a primary copy, and copy 5 is a standby copy. In this case, copy 4 can trigger copy 5 to participate in a distributed election initiated in the database system by copies 1~3 in any auxiliary node or cluster 1. Details are omitted for simplicity.

Similar to scenario 1, a network connection can also exist between auxiliary nodes and clusters in the database system in scenario 2. For example, a network connection can exist between the clusters in the database system, and certainly, a network connection can also exist between the copies in any cluster, so that a corresponding network connection is established between the copies in the database system. Each copy in any cluster can interact with another database cluster or the auxiliary nodes, or can interact with another database cluster or the auxiliary nodes through a primary copy in the each copy. Even, a network connection can be directly established between the copies in the different clusters. For example, copies 1~3 in cluster 1 are separately connected to copies 4 and 5 in cluster 2, and the copies in the database system separately establish network connections to the auxiliary nodes, so that the auxiliary nodes and the copies in the database system form a fully-connected communication network. In addition, data interaction between any copies, between any auxiliary nodes, and between any copies and the auxiliary nodes can be implemented based on the communication connections. Details are omitted for simplicity.

FIG. 3 is used as an example. As a primary database of the first table at the current moment, copy 1 can apply to the auxiliary nodes and all clusters for extension of a term of copy 1 during the current term. For example, copy 1 can separately initiate a term extension proposal for a primary database identity of copy 1 to assists 1~2 and copies 2~5 at any moment before the current term ends. When the term extension proposal is received, assists 1~2 and/or copies 2~5 can return voting messages indicating their opinions (approval or rejection) to copy 1 (if the opinions can be represented by values of intent fields in the messages), so that copy 1 can determine, based on the voting messages, whether the senders of the messages approve or reject the term extension proposal. Alternatively, when the term extension proposal is received, either party of assists 1~2 and copies 2~5 can return a corresponding voting message when approving the proposal and return no message when rejecting the proposal. Correspondingly, copy 1 can determine a corresponding quantity of approval votes based on the received voting message. It can be understood that, because copy 1 is the initiator of the term extension proposal, copy 1 naturally approve the extension of the term of copy 1 (i.e., there is at least one approval vote for the term extension proposal), which is equivalent to that the term extension proposal is further used to instruct copy 1 to approve the proposal. Therefore, if copy 1 receives more than half of approval votes before the current term ends, it can be determined that the term of copy 1 is successfully extended. Thereafter, copy 1 can continue to act as the primary database of the first table. Otherwise, if copy 1 does not receive more than half of the approval votes before the current term ends, it can be determined that copy 1 does not receive more than half of the approval votes, and then it can be determined that the extension of the term of copy 1 fails. After the current term ends, copy 1 can downgrade itself to a standby database of the first table.

The above-mentioned way in which the term of the copy is extended by initiating a term extension proposal is only one term extension way that can be used by copy 1. In a solution implementation process, the term of copy 1 can also be extended in a way of sending a heartbeat message based on a fixed period, separately monitoring the current term and actively initiating a term extension message by each auxiliary node or each standby database, etc. Details are omitted for simplicity.

In some example embodiments, copy 4 can initiate a second primary database election proposal to assists 1~2, copies 1~3, and copy 5, and the proposal is used to instruct copy 4 to approve to elect a certain copy as a new primary database and is used to trigger assists 1~2, copies 1~3, and copy 5 to respectively submit voting messages for the proposal. Certainly, copy 4 can alternatively initiate the second primary database election proposal to copy 1 and copy 1 forwards the proposal to copies 2 and 3, and initiate the second primary database election proposal to assist 2 and assist 2 forwards the proposal to assist 1, etc. Details are omitted for simplicity. The "certain copy" indicated by the second primary database election proposal can be any copy (e.g., copy 4) specified in the proposal by copy 4, or can be a predetermined default copy (the default copy can be any copy in the database system), which is not limited in this specification. Accordingly, after receiving the second primary database election proposal, any auxiliary node or any cluster can submit a voting message for the proposal. The voting message submitted by any participant can be used to indicate whether the participant approves the second primary database election proposal, so that a receiver counts a voting result of the second primary database election proposal based on the received voting message, and further determines whether a copy designated by the proposal is elected as a new primary database. Any participant can submit the voting message to the initiator of the second primary database election proposal, or can separately submit the voting message to each participant (i.e., all auxiliary node and all copies, rather than the any participant, that participate in voting for the proposal) of the second primary database election proposal. Details are omitted for simplicity. In this way, each auxiliary node and each copy in cluster 1 and cluster 2 separately participate in voting for the second primary database election, so that a new primary database can be determined as accurately as possible even in a scenario in which some copies or auxiliary nodes in the database system are abnormal, etc.

Similar to the first primary database election proposal, because any auxiliary node and any copy may be abnormal (e.g., disconnection between assist 1 and copy 4, disconnection between assist 2 and copy 2, or failure or even breakdown of assist 2 or copy 3), any auxiliary node or any copy may not successfully receive the second primary database election proposal initiated by copy 4. It is hereby stated that based on this, the above-mentioned description "copy 4 initiates a second primary database election proposal to the auxiliary nodes and the other copies" should be understood as "copy 4 attempts to initiate a second primary database election proposal to the auxiliary nodes and the other copies"; and any auxiliary node or any copy can attempt to participate in the voting for the proposal in the above-mentioned way when the proposal is received.

In an embodiment, when a modification request for the first table is received, the primary database can modify local data of the first table according to the modification request. In addition, the primary database can further synchronize a modification log corresponding to the above-mentioned modification to each standby database, so that each standby database separately modifies the local data of the first table according to the modification log. As described earlier, both the primary database and the standby databases are copies in the database system, and based on this, the local data of the first table modified by any copy is local data of the first table maintained by the copy. As shown in FIG. 3, copies 1~3 in cluster 1 and copies 4~5 in cluster 2 can respectively modify the local data of the first table maintained by themselves, where copy 1 can perform modification in response to the modification request, and copies 2~5 can perform modification based on the modification log delivered by copy 1. The modification performed by any copy can be an operation such as adding, deleting, or modifying the local data maintained by the copy, which is not limited in this specification.

The database system usually needs to write (or persist) the data of the first table into the database in an operating process. When the database system is in a normal operating state, each copy of the first table in the database system separately persists the latest data at the current moment, so that the same data are separately persisted into each copy included in the database system. However, in an actual operating process, the primary database and the standby databases may be abnormal, for example, a network connection between two clusters is disconnected, a certain cluster fails or even breaks down, or the latest data cannot be persisted (or a log lags) because a relatively large quantity of tasks are currently written into a certain copy.

To cope with different service scenarios, the database system can run in different operating modes, such as a maximum performance mode, a maximum protection mode, or a maximum available mode. Data persistence rules corresponding to the different operating modes are different. For example, in the maximum performance mode, data are asynchronously synchronized and separately persisted between the primary database and the standby databases. In this case, even if the standby databases are abnormal, the performance of the primary database is not affected by the abnormality of the standby databases. In the maximum protection mode, data are strongly synchronized between the primary database and the standby databases. Any data are considered successfully written only after the data are successfully persisted in both the primary database and the standby databases. This mode can ensure data consistency between the primary database and the standby databases, to avoid data loss. In the maximum available mode, if both the primary database and the standby databases are in a normal operating state, data are strongly synchronized between the primary database and the standby databases. In this case, a data persistence way is consistent with the above-mentioned maximum protection mode. If the primary database perceives that the standby databases are abnormal, the primary database no longer waits for strong synchronization of data with the standby databases, but starts asynchronous synchronization of data. In this case, the data persistence way is consistent with the above-mentioned maximum performance mode. The database system described in this specification is in the maximum available mode at the current moment.

Each cluster in the database system includes a corresponding quantity of copies. For example, the primary database and the standby database each can include m, n1, n2, . . . , or ni (i≥0) copies. In addition, each cluster further has a corresponding write success threshold. For example, there are M, N1, N2, . . . , or Ni write success thresholds for the primary database and each standby database, and 0<M≤m, 0<N1≤n1, 0<N2≤n2, . . . , and 0<Ni≤ni. As shown in FIG. 3, cluster 1 and cluster 2 are respectively a primary database and a standby database at the current moment. Clearly, in this case, i=2, m=3, n=2, 0<M≤3, and 0<N≤2.

A write success threshold corresponding to cluster 1 is M, which indicates that for the latest data that need to be persisted, it can be determined that cluster 1 successfully persists the data only if at least M copies in cluster 1 can successfully persist the data. Similarly, a write success threshold corresponding to cluster i is Ni, which indicates that for the latest data that need to be persisted, it can be determined that cluster i successfully persists the data only if at least Ni copies in cluster i can successfully persist the data. Details are omitted for simplicity. M of the primary database cluster 1 is greater than zero, i.e., the latest data need to be successfully persisted in at least M copies of cluster 1. N of the standby database cluster 2 is greater than zero, i.e., the latest data need to be persisted in at least N copies of cluster 2. The m, n1, n2, . . . , or ni and M, N1, N2, . . . , or Ni described in this specification can be fixed values. Each value can be predetermined by an administrator of the database system, etc. based on a specific application scenario of the database system, and the primary database and the standby databases separately store the above-mentioned fixed values locally.

In addition to storing the predetermined fixed value of each write success threshold locally, each cluster can maintain a current value of each write success threshold (i.e., a local value of the write success threshold described in this specification). Based on this, the cluster can control the database system to operate in different operating modes by adjusting the current value of the write success threshold, to improve the availability of the database system. It can be learned that, in a running process of the database system, fixed values of M and N that are locally stored in each cluster are predetermined and cannot be adjusted. However, the current values of M and N are variables, and can be correspondingly adjusted based on an election result. A specific process is omitted for simplicity. It can be understood that the current values of M and N that are locally maintained in the first and second database clusters are related to an operating mode of the database system at the current moment: In the maximum performance mode, M>0, and N1, N2, . . . , or Ni=0; in the maximum protection mode, M>0, and N1, N2, . . . , or Ni>0; and in the maximum available mode, M>0, and N1, N2, . . . , or Ni>0 when the primary database is normal, primary-standby switching is performed first when the primary database is abnormal, and after the switching is completed, it is adjusted to M=0 (M is the write success threshold of the original primary database), and N1, N2, . . . , or Ni>0. As shown in FIG. 3, m of the primary database cluster 1 is equal to 3 and n of the standby database cluster 2 is equal to 2. It is hereby stated that in the following embodiments, it can be assumed that M of cluster 1 is equal to 2 and N of cluster 2 is equal to 1.

In addition, to facilitate that a majority and a corresponding minority of a voting result of any distributed election initiated in the database system can be formed, to intuitively determine the voting result, a quantity of votes of each auxiliary node and each cluster can be reasonably set. When the quantities of copies in the primary database and each standby database are respectively m and n (n=n1+n2+ . . .

+ni) and m/n, a quantity of auxiliary nodes and quantities of votes owned by the auxiliary nodes and the copies can be set to meet a specific quantitative relationship.

For example, the quantity of auxiliary nodes can be set to be greater than the absolute value of the difference between m and n, and the quantity of votes for any auxiliary node can be the same as that of any copy. As shown in FIG. 3, if both the quantity of votes of each auxiliary node and the quantity of votes of each copy are 1, the quantity of auxiliary nodes only needs to be greater than 1 (i.e., abs(m−n)). As shown in FIG. 3, there are two auxiliary nodes. For another example, the quantity of auxiliary nodes can be set to one, the quantity of votes of the auxiliary node is set to be greater than the absolute value of the difference between m and n, and the quantities of votes of any two copies are the same. For example, when the database system shown in FIG. 1 is applied to scenario 2, if a quantity of votes owned by each copy in cluster 1 and cluster 2 is the same, for example, 1, the quantity of votes of the auxiliary node can be set to be greater than the absolute value of the difference between m and n, for example, the quantity of votes of the auxiliary node set to be greater than 2. For another example, the quantity of auxiliary nodes can be set to one, the quantity of votes of the auxiliary node is at least one, a quantity of votes of any copy in the first database cluster is k*n, and a quantity of votes of any copy in the second database cluster is k*m, where k is a positive integer. When the database system shown in FIG. 1 is applied to scenario 2, a quantity of votes of any copy in copies 1~3 can be set to 2 and a quantity of votes of any copy in copies 4~5 can be set to 3. In this case, the quantity of votes of the auxiliary node can be set to at least 1. Certainly, the quantity of votes of the auxiliary node can be set to an odd number, to ensure that a majority and a corresponding minority of a voting result are formed. As described above, m and n are predetermined fixed values. In this case, the quantity of auxiliary nodes or copies and a quantity of votes owned by each of the auxiliary nodes and copies can be properly set, to make it possible to form a clear majority and a corresponding minority of an election result of any distributed election in the database system.

The abnormality in the primary database or the standby databases may not be instantaneous breakdown, but usually lasts for a period of time. In a related technology in which primary-standby switching is triggered by a period of time of a log lag, the primary database continues to write the latest log locally because the primary database may not find any abnormality in this period of time. However, logs written into the primary database in this period of time are not written into the standby databases. Therefore, these logs can be lost after the abnormality is resolved. In other words, in the related technology, when a primary log database is switched in the maximum available mode, a write operation of an old primary log database cannot be strictly stopped, thereby causing a problem of log loss. For this purpose, in the solution in this specification, the problem is resolved by using the above-mentioned write success threshold.

In an embodiment, based on the write success threshold existing in each cluster, when a modification request for the first table is received, the primary database can send, to each standby database, a modification log of the first table corresponding to the modification request, and receive a response message for the modification log; and then, when the received response message indicates that the quantity of copies, in each cluster, capable of modifying the local data of the first table according to the modification log meets the write success threshold of the respective cluster, the primary database returns a modification instruction to each copy capable of modifying the local data of the first table according to the modification log, to trigger the each copy to complete modification. For example, before the primary database and the standby databases write any log locally, the primary copy in the primary database can count quantities of copies into which the log can be written, for example, the primary copy can send a to-be-written log to each copy in each cluster, and any copy after receiving the log can determine, based on a current log write status of the copy (for example, whether another log is being written into the copy at the current moment, and whether a quantity of logs that have been received by the copy but have not been written into the copy exceeds a threshold), whether the log can be written into the copy, and return a determining result to the primary copy in the primary database; further, the primary copy can count the result returned by each copy, to determine the quantities of copies, of the primary database and each standby database, into which the log can be separately written. When the quantities of copies each are not less than M, N1, N2, . . . , or Ni, the primary copy can write the log locally, and instruct the other copies (or copies into which the log can be written) to write the log locally, thereby completing persistence of the log. Alternatively, when the log is received by each copy, the copy can separately send a result about whether the log can be written into the copy to the other copies, so that the copies separately count the quantity of copies, of the primary database and each standby database, into which the log can be written, and write the log locally when the quantity of copies is not less than M, N1, N2, . . . , or Ni, thereby completing persistence of the log.

As shown in FIG. 3, before cluster 1 and cluster 2 write any log locally, copy 1 can count quantities of copies into which the log can be written, for example, copy 1 can separately send a to-be-written log to copies 2~5, and any copy after receiving the log can determine, based on a current log write status of the copy (for example, whether another log is being written into the copy at the current moment, and whether a quantity of logs that have been received by the copy but have not been written into the copy exceeds a threshold), whether the log can be written into the copy, and return a determining result to copy 1; further, copy 1 can count the result returned by each copy, to determine the quantities of copies, in cluster 1 and cluster 2, into which the log can be separately written. When the quantities of copies, in cluster 1 and cluster 2, into which the log can be written, are not less than 2 and 1 respectively, copy 1 can write the log locally and instruct each copy into which the log can be written to write the log locally, thereby completing persistence of the log.

It can be understood that when the primary database or the standby databases are abnormal, if the primary database still writes some logs locally, the logs cannot be written into the standby databases, that is, the logs lag. Moreover, these logs may be lost after the abnormality is resolved. It can be learned from the above-mentioned embodiments that because both M and N are greater than zero, and the first database cluster writes the log locally only when the condition "the quantity of copies, in each cluster, capable of modifying the local data of the first table according to the modification log meets the write success threshold of the respective cluster" is met. Therefore, no matter whether the primary database or the standby database is abnormal, the above-mentioned condition cannot be met. In this case, the primary database does not write the log locally, to avoid a problem of a log lag or even a log loss probably caused when the primary database continues to write the log locally when the primary database or the standby database is abnormal.

Further, when a copy, in all copies of the first table, that obtains more than half of approval votes is elected as a new primary database, each copy can update a local value of the write success threshold, of the original primary database, that is maintained by the copy to zero. As shown in FIG. 3, when cluster 1 is a primary database and cluster 2 is a standby database, if cluster 1 is abnormal, cluster 2 is elected as a new primary database. In this case, copies 1~5 can respectively update local values (i.e., current values of M maintained by the copies) of the write success threshold, of cluster 1, maintained by the copies to zero. It can be understood that, at the initial stage after completion of the above-mentioned primary-standby switching, the original primary database may not be restored to normal. Therefore, in this way, each cluster updates the local value of the write success threshold of the original primary database to zero, to switch the database system from the maximum available mode to the maximum performance mode, so that the primary database after completion of the switching can immediately start receiving and responding to service traffic for the data of the first table, to make the database system resume normal running as soon as possible, thereby reducing a possible processing delay caused by the abnormality of the primary database and a primary-standby switching process, and improving the availability of the system. Alternatively, when a copy, in all copies of the first table, that obtains more than half of approval votes is elected as a new primary database, if the new primary database and the abnormal original primary database are not the same copy, each copy can further mark the running state of the original primary database as offline, for example, update the locally maintained running state of the original primary database to an offline state, to stop the original primary database from participating in the running of the database system, thereby preventing the original primary database from adversely affecting the other copies.

In the above-mentioned embodiment, it is determined, from a perspective of a standby database, that the primary database is abnormal. Actually, when the primary database is abnormal, the primary database may consider that the standby database is abnormal. Therefore, after the current term of any copy (i.e., the original copy) ends and the copy downgrades itself to a standby database, the copy can initiate another distributed election to the auxiliary node and each standby database to elect the any copy as the primary database of the first table. It can be learned that the auxiliary node can still receive the another distributed election (hereinafter referred to as second election) sent from the any copy that downgrades from the primary database to the standby database, within a predetermined time period in which the auxiliary node receives the distributed election (hereinafter referred to as first election) for the primary database of the first table initiated by the other auxiliary node and/or (original standby databases) copies. Clearly, the initiators of the two elections have different conclusions about whether the any copy is abnormal, and in this case, the auxiliary node can handle the different conclusions in various ways.

For example, in view of the above-mentioned principle of not acting maliciously, the auxiliary node can choose to trust the any copy unconditionally, i.e. directly approve the second election (initiated by the any copy) and ignore the first election (initiated by the other auxiliary node and/or copies), to minimize the possible processing delay caused by the primary-standby switching to the service traffic.

For another example, the auxiliary node can further determine whether the any copy is truly abnormal. For example, the auxiliary node can initiate a state query request to the any copy that has downgraded to a standby database, and receive a query result returned by the copy. In view of the above-mentioned principle of not acting maliciously, the auxiliary node can trust the query result unconditionally. Thus, when the query result returned by the copy indicates that the any copy is in a normal running state, the auxiliary node can approve the second election and ignore the first election. In this case, the elected new primary database is still the any copy, and primary-standby switching is not needed.

Alternatively, when the query result returned by the any copy indicates that the copy is in an abnormal running state, the auxiliary node can approve the first election and ignore the second election. In this case, the elected new primary database is another copy other than the any copy, and thereafter the copies can perform primary-standby switching. Specifically, each copy can update locally recorded information about the primary database to information about the copy corresponding to the first election, and the copy can upgrade itself to a primary database. In addition, each copy can further update the locally maintained local value of M corresponding to the any copy (i.e., the original primary database) to zero, i.e., the operating mode of the database system is adjusted from the maximum available mode to the maximum performance mode, or the running state of the any copy is marked as offline, to stop each copy in the cluster from participating in the running of the database system.

Similar to the above-mentioned description that the primary database is abnormal, the standby database or the auxiliary node in the database system can also be abnormal, e.g., any standby database or the auxiliary node may have an abnormality such as a communication failure, a log lag, or even a breakdown. When it is perceived that any participant is abnormal, to maintain normal running of the database system, the other participants can initiate an election to enable the abnormal participant to go offline. For example, when determining that any standby database is abnormal, the primary database and/or the auxiliary node can initiate a distributed election for the standby database, and mark the running state of the any standby database as offline when a quantity of approval votes for the election exceeds half. As shown in FIG. 3, assist 1 can attempt to separately initiate a standby database offline proposal for copy 5 to assists 1~2 and copies 1~4 when it is perceived that copy 5 is abnormal. Correspondingly, assists 1~2 and copies 1~4 can respectively return voting messages for the proposal to assist 1 (or can send voting messages to each other) when the standby database offline proposal is received, to inform assist 1 of their attitudes (approval or rejection) for the proposal. Certainly, if the standby database offline proposal is successfully received, copy 5 can return a corresponding voting message to assist 1. In addition, assist 1 can count a quantity of approval votes for the proposal based on the content of the received voting messages and a quantity of the voting messages, and mark the running state of copy 5 as offline when the quantity of approval votes exceeds half. Similarly, assists 1~2 and copies 1~4 can also mark the running state of copy 5 as offline.

For another example, when determining that any auxiliary node is abnormal, the primary database and/or the standby databases can initiate a distributed election for the auxiliary node, and mark the running state of the any auxiliary node as offline when a quantity of approval votes for the election exceeds half. As shown in FIG. 3, copy 1 can attempt to separately initiate an auxiliary node offline proposal for assist 1 to assist 2 and copies 2~5 when it is perceived that assist 1 is abnormal. Correspondingly, assist 2 and copies 2~5 can return voting messages for the proposal to copy 1 (or can send voting messages to each other) when the auxiliary node offline proposal is received, to inform assist 1 of their attitudes (approval or rejection) for the proposal. Certainly, if the auxiliary node offline proposal is successfully received, assist 1 can return a corresponding voting message to copy 1. In addition, copy 1 can count a quantity of approval votes for the proposal based on the content of the received voting messages and a quantity of the voting messages, and mark the running state of copy assist 1 as offline when the quantity of approval votes exceeds half. Similarly, assist 2 and copies 2~5 can also mark the running state of assist 1 as offline.

Any auxiliary node or any copy in the database system locally maintains the running states of each auxiliary node and each cluster. Based on this, the any standby database or any auxiliary node is marked as offline, i.e., the locally maintained running state of the any standby database or any auxiliary node is updated to an offline state. If the any standby database is marked as offline, the primary database can thereafter avoid synchronizing a modification log to the standby database when modifying the data for the first table, and the auxiliary node and the other copies can thereafter avoid initiating a distributed election to the standby database, so that each copy included in the cluster does not participate in voting for the distributed election. For another example, if any auxiliary node is marked as offline, the copies in the database system can avoid initiating a distributed election to the auxiliary node, so that the auxiliary node does not participate in voting for the distributed election. As such, the offline copy or auxiliary node can stop participating in the running of the database system for related affairs of the first table, to avoid causing interference to the primary database and the other normal standby databases, thereby ensuring normal running of the database system.

Certainly, after being restored to normal, the offline copy or auxiliary node can initiate an election to come back online, to continue to participate in running of the blockchain system. For example, when any offline copy determines that it is restored to normal, the any offline copy can initiate a copy restoration proposal for the copy to the other copies and auxiliary nodes, participate in voting for the proposal, and further, when it is determined that more than half of approval votes are obtained, mark the locally maintained running state of the copy as online. Similarly, the auxiliary node and the other copies that participate in the voting can also mark the locally maintained running state of the any copy as online. After the above-mentioned running state is marked, the any copy is restored to a normal copy in the database system, and thereafter can participate in the normal running of the database system. Similarly, when any offline auxiliary node determines that it is restored to normal, the offline auxiliary node can initiate an auxiliary node restoration proposal for the auxiliary node to the other auxiliary nodes and copies, participate in voting for the proposal, and further, when it is determined that more than half of approval votes are obtained, mark the locally maintained running state of the auxiliary node as online. Similarly, the other auxiliary nodes and copies that participate in voting can also mark the locally maintained running state of the any auxiliary node as online. After the above-mentioned running state is marked, the any auxiliary node is restored to a normal auxiliary node in the database system, and thereafter can participate in the normal running of the database system.

Corresponding to the database system described in the embodiments of scenario 2, this specification further provides a primary database election method. Refer to FIG. 4, a flowchart illustrating a primary database election method. As shown in FIG. 4, the method can be applied to the auxiliary nodes and/or the copies of the first table in the database system in any embodiment of scenario 2, and the method includes steps 402-404.

Step 402: If any cluster is a primary database of the first table and the other clusters are standby databases, initiate a distributed election for the primary database of the first table among the auxiliary nodes and copies of the first table when it is determined that the auxiliary nodes and the copies of the first table do not record the primary database of the first table in term.

Step 404: Elect a copy that obtains more than half of approval votes as a new primary database.

For a specific implementation process of steps 402-404, refer to the detailed descriptions in the embodiments of the database system in scenario 2. Details are omitted here for simplicity.

In the above-mentioned embodiment, the database system includes, in addition to a plurality of clusters, at least one auxiliary node, where each cluster includes data of at least one copy of the first table, and the auxiliary node does not include data of the first table. When any cluster is the primary database of the first table and the other clusters are standby databases, the primary database applies to all auxiliary nodes and all copies for extension of a term of the primary database during the current term; and if the primary database obtains more than half of approval votes before the current term ends, the primary database determines that the term of the primary database is successfully extended, otherwise, the primary database downgrades itself to a standby database. Accordingly, when the auxiliary node and/or the copies determine that the auxiliary node and/or the copies do not record the primary database of the first table in term, the auxiliary node and/or the copies can initiate a distributed election for the primary database of the first table among the auxiliary node and all the copies, and elect a cluster that obtains more than half be of approval votes as a new primary database.

It can be learned that in this solution, at least one auxiliary node that does not include the data of the first table is introduced into the database system, the above-mentioned auxiliary node participates in the distributed election for the primary database of the first table, and then a copy that obtains more than half of approval votes is elected as a new primary database. Because the above-mentioned distributed election is initiated among the auxiliary node and all the copies, each auxiliary node and each copy that receive the election in the database system participate in voting, and a finally elected new primary database is determined based on a joint voting result of each auxiliary node and each copy. It can be learned that the new primary database is a result of a joint decision of each auxiliary node and each copy in the database system, rather than an independent decision of either party.

In this solution, when a certain copy obtains more than half of approval votes, the copy can be automatically and quickly determined as a new primary database without manual intervention by operation and maintenance personnel, which reduces labor costs and improves decision-making efficiency. In addition, even when a certain party is abnormal, the remaining parties can jointly determine a new primary database through the above-mentioned voting process, which helps achieve high availability of the database system.

FIG. 5 is a schematic structural diagram illustrating a device, according to some example embodiments. References are made to FIG. 5. At the hardware level, the device includes a processor 502, an internal bus 504, a network interface 506, a memory 508, and a non-volatile memory 510, and certainly may further include other hardware needed by a service. One or more embodiments of this specification can be implemented in a software-based way, for example, the processor 502 reads a corresponding computer program from the non-volatile memory 510 to the memory 508, and then runs the computer program. Certainly, in addition to a software implementation, one or more embodiments of this specification do not rule out other implementations, such as an implementation of a logic device or a combination of software and hardware. In other words, an execution body of the following processing procedure is not limited to each logical unit, and can be hardware or a logic device.

As shown in FIG. 6, FIG. 6 is a block diagram illustrating a primary database election apparatus, according to some example embodiments of this specification. The apparatus is applied to the auxiliary node and/or any cluster in the database system as described in scenario 1. The apparatus includes: an election initiating unit 601, configured to initiate a distributed election for the primary database of the first table among the auxiliary node and the clusters when it is determined that the auxiliary node and the clusters do not record the primary database of the first table in term; and a primary database election unit 602, configured to elect a cluster that obtains more than half of approval votes as a new primary database.

As shown in FIG. 7, FIG. 7 is a block diagram illustrating another primary database election apparatus, according to some example embodiments of this specification. The apparatus is applied to the auxiliary nodes and/or the copies of the first table in the database system as described in scenario 2. The apparatus includes: an election initiating unit 701, configured to initiate a distributed election for the primary database of the first table among the auxiliary nodes and the copies of the first table when it is determined that the auxiliary nodes and the copies of the first table do not record the primary database of the first table in term; and a primary database election unit 702, configured to elect a copy that obtains more than half of approval votes as a new primary database.

In the 1990s, whether a technical improvement is a hardware improvement (for example, an improvement to a circuit structure such as a diode, a transistor, or a switch) or a software improvement (an improvement to a method procedure) can be clearly distinguished. However, as technologies develop, current improvements to many method procedures can be considered as direct improvements to hardware circuit structures. Almost all designers program an improved method procedure into a hardware circuit, to obtain a corresponding hardware circuit structure. Therefore, a method procedure can be improved by using a hardware entity module. For example, a programmable logic device (PLD) (e.g., a field programmable gate array (FPGA)) is such an integrated circuit, and a logical function of the PLD is determined by a user through device programming. The designer performs programming to "integrate" a digital system to a PLD without requesting a chip manufacturer to design and manufacture an application-specific integrated circuit chip. In addition, currently, instead of manually manufacturing an integrated circuit chip, such programming is mostly implemented by using "logic compiler" software. The "logic compiler" software is similar to a software compiler used in program development and writing. Original code needs to be written in a specific programming language before being compiled. The language is referred to as a hardware description language (HDL). There are many types of HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). At present, the Very-High-Speed Integrated Circuit Hardware Description Language (VHDL) and Verilog are most commonly used. It should also be clear to a person skilled in the art that a hardware circuit for implementing the logic method procedure can be easily obtained by means of slightly logic programming and programming into an integrated circuit by using the above-mentioned several hardware description languages.

A controller can be implemented in any suitable way. For example, the controller can be in a form such as a microprocessor, a processor, or a computer-readable medium, a logic gate, a switch, an application-specific integrated circuit (ASIC), a programmable logic controller, or an embedded microcontroller storing computer-readable program code (such as software or firmware) that can be executed by the (micro) processor. Examples of the controller include but are not limited to the following microcontrollers: ARC 625D, Atmel AT91SAM, Microchip PIC18F26K20, and Silicone Labs C8051F320. A memory controller can also be implemented as a part of control logic of a memory. A person skilled in the art also knows that, in addition to implementing the controller in a pure computer-readable program code way, a method step can be logically programmed, so that the controller implements the same function in a form of a logic gate, a switch, an application-specific integrated circuit, a programmable logic controller, an embedded microcontroller, and the like. Therefore, the controller can be considered as a hardware component, and an apparatus configured to implement various functions in the controller can also be considered as a structure in the hardware component. Alternatively, an apparatus for implementing various functions can be considered as a software module implementing a method or a structure in a hardware component.

The systems, apparatuses, modules, or units described in the above-mentioned embodiments can be specifically implemented by a computer chip or an entity, or can be implemented by a product having a certain function. A typical implementation device is a server system. Certainly, this specification does not exclude the possibility that, with the development of future computer technologies, the computer for implementing the functions in the above-mentioned embodiments can be, for example, a personal computer, a laptop computer, an in-vehicle man-machine interaction device, a cellular phone, a camera phone, a smartphone, a personal digital assistant, a media player, a navigation device, an email device, a game console, a tablet computer, a wearable device, or a combination of any of these devices.

Although one or more embodiments of this specification provide the method operation steps as described in the embodiments or flowcharts, a conventional or uncreative means can include more or less operation steps. The step sequence listed in the embodiments is only one of a plurality of step execution sequences, and does not represent a unique execution sequence. When an apparatus or a terminal product actually executes the method, the apparatus or the terminal product can execute the method in the method sequence shown in the embodiments or the accompanying drawings or execute the steps in parallel (e.g., in a parallel-processor or multi-thread processing environment, or even in a distributed data processing environment). The term "include", "comprise", or any other variant thereof is intended to cover non-exclusive inclusion, so that a process, method, product, or device that includes a series of elements includes not only those elements but also other elements that are not expressly listed, or includes elements inherent to such a process, method, product, or device. Without more constraints, it is not excluded that the process, method, product, or device including the described elements can also include additional identical or equivalent elements. For example, if the terms such as "first" and "second" are used to represent names, they do not indicate any specific order.

For ease of description, the above-mentioned apparatus is described separately by dividing functions into various modules. Certainly, when one or more of the embodiments in this specification are implemented, functions of the modules can be implemented in the same or more pieces of software and/or hardware, or modules that implement the same function can be implemented by a combination of a plurality of submodules or subunits, etc. The apparatus embodiment described above is merely an example. For example, division into the units is merely logical function division and can be other division in actual implementation. For example, a plurality of units or components can be combined or integrated into another system, or some features can be ignored or not performed. In addition, the displayed or discussed mutual couplings or direct couplings or communication connections can be implemented by using some interfaces. The indirect couplings or communication connections between the apparatuses or units can be implemented in electronic, mechanical, or other forms.

The present disclosure is described with reference to the flowcharts and/or block diagrams of the method, the apparatus (system), and the computer program product according to the embodiments of the present disclosure. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so the instructions executed by the computer or the processor of the another programmable data processing device generate an apparatus for implementing a specific function in one or more procedures in the flowcharts and/or in one or more blocks in the block diagrams.

Alternatively, these computer program instructions can be stored in a computer-readable storage that can instruct a computer or another programmable data processing device to work in a specific way, so the instructions stored in the computer-readable storage generate an artifact that includes an instruction apparatus. The instruction apparatus implements a specific function in one or more procedures in the flowcharts and/or in one or more blocks in the block diagrams.

Alternatively, these computer program instructions can be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more procedures in the flowcharts and/or in one or more blocks in the block diagrams.

In a typical configuration, a computing device includes one or more processors (CPUs), one or more input/output interfaces, one or more network interfaces, and one or more memories.

The memory may include a form such as a volatile memory, a random access memory (RAM), or a non-volatile memory in a computer-readable medium, for example, a read-only memory (ROM) or a flash memory (flash RAM). The memory is an example of the computer-readable medium.

The computer-readable medium includes persistent, non-persistent, removable, and non-removable media that can store information by using any method or technology. The information can be computer-readable instructions, a data structure, a program module, or other data. Examples of the computer storage medium include but are not limited to a phase change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage, a graphene storage, another magnetic storage device, or any other non-transmission medium. The computer storage medium can be configured to store information that can be accessed by a computing device. Based on the definition in this specification, the computer-readable medium does not include transitory media such as a modulated data signal and carrier.

A person skilled in the art should understand that one or more embodiments of this specification can be provided as a method, system, or computer program product. Therefore, the one or more embodiments of this specification can use a form of hardware only embodiments, software only embodiments, or embodiments with a combination of software and hardware. In addition, the one or more embodiments of this specification can use a form of a computer program product that is implemented on one or more computer-usable storage media (including but not limited to a disk storage, a CD-ROM, an optical storage, etc.) that include computer-usable program code.

The one or more embodiments of this specification can be described in the general context of computer-executable instructions executed by a computer, for example, a program module. Generally, the program module includes a routine, a program, an object, a component, a data structure, etc. for executing a specific task or implementing a specific abstract data type. The one or more embodiments of this specification can alternatively be practiced in distributed computing environments. In these distributed computing environments, tasks are executed by remote processing devices that are connected through a communication network. In the distributed computing environments, program modules can be located in local and remote computer storage media including storage devices.

The embodiments of this specification are described in a progressive way. For same or similar parts in the embodiments, refer to each other. Each embodiment focuses on a difference from the other embodiments. Particularly, the system embodiment is basically similar to the method embodiment, and therefore is briefly described. For a related part, refer to some descriptions in the method embodiment. In the descriptions of this specification, reference to the descriptions of the terms "one embodiment", "some embodiments", "example", "specific example", or "some examples" means that specific features, structures, materials, or characteristics described in the embodiments or examples are included in at least one embodiment or example of this specification. In this specification, example descriptions of the above-mentioned terms do not need to be specific to the same embodiment or example. In addition, the described specific features, structures, materials, or characteristics can be combined in a proper way in any one or more embodiments or examples. In addition, without mutual contradictoriness, a person skilled in the art can integrate or combine different embodiments or examples described in this specification and features of different embodiments or examples.

The above-mentioned descriptions are merely embodiments of one or more embodiments of this specification, and are not intended to limit the one or more embodiments of this specification. A person skilled in the art can make various changes and variations to the one or more embodiments of this specification. Any modification, equivalent replacement, or improvement made without departing from the spirit and principle of this specification shall fall within the scope of the claims.

What is claimed is:

1. A database system, comprising at least one auxiliary node and a plurality of clusters, wherein each cluster comprises data of at least one copy of a first table, and the auxiliary node does not comprise data of the first table; upon determining that any cluster is a primary database of the first table and the other clusters are standby databases:

the primary database applies to all auxiliary nodes and all clusters for extension of a term of the primary database during the current term, and upon determining that the primary database obtains more than half of approval votes before the current term ends, the primary database determines that the term of the primary database is successfully extended, otherwise, the primary database downgrades itself to a standby database; and when the auxiliary node and/or the clusters determine that the auxiliary node and/or the clusters do not record the primary database of the first table in term, the auxiliary node and/or the clusters initiate a distributed election for the primary database of the first table among the auxiliary node and the clusters, and elect a cluster that obtains more than half of approval votes as a new primary database;

wherein the primary database and/or the auxiliary node are/is further configured to:

when it is determined that any standby database is abnormal, initiate a distributed election for the any standby database, and mark a running state of the any standby database as offline when a quantity of approval votes for the election exceeds half.

2. The system according to claim 1, wherein that the auxiliary node and/or the clusters do not record the primary database of the first table currently in term comprises:

the auxiliary node and/or the clusters do not record information about the primary database of the first table; or information about the primary database of the first table recorded by the auxiliary node and/or the clusters indicates that the term of the primary database has ended.

3. The system according to claim 1, wherein the distributed election is initiated by a cluster after the current term of the primary database ends, and the cluster initiating the distributed election is the primary database or any standby database.

4. The system according to claim 1, wherein the primary database is further configured to:

when a modification request for the first table is received, modify local data of the first table according to the modification request, and synchronize a corresponding modification log to each standby database, so that each standby database separately modifies the local data of the first table according to the modification log.

5. The system according to claim 1, wherein the primary database and/or the standby database are/is further configured to:

when it is determined that the auxiliary node is abnormal, initiate a distributed election for the auxiliary node, and mark a running state of the auxiliary node as offline when a quantity of approval votes for the election exceeds half.

6. The system according to claim 1, wherein the first table is any table or a predefined specific table.

7. A database system, comprising at least one auxiliary node and at least one cluster, wherein each cluster comprises data of at least one copy of a first table, the first table has a plurality of copies in total, and the auxiliary node does not comprise data of the first table; upon determining that any copy of the first table is a primary database and the other copies are standby databases:

the primary database applies to all auxiliary nodes and all copies for extension of a term of the primary database during the current term, and upon determining that the primary database obtains more than half of approval votes before the current term ends, the primary database determines that the term of the primary database is successfully extended, otherwise, the primary database downgrades itself to a standby database; and when the auxiliary node and/or the copies of the first table determine that the auxiliary node and/or the copies do not record the primary database of the first table in term, the auxiliary node and/or the copies of the first table initiate a distributed election for the primary database of the first table among the auxiliary node and the copies of the first table, and elect a copy that obtains more than half of approval votes as a new primary database;

wherein the primary database and/or the auxiliary node are/is further configured to:

when it is determined that any standby database is abnormal, initiate a distributed election for the any standby database, and mark a running state of the any standby database as offline when a quantity of approval votes for the election exceeds half.

8. The system according to claim 7, wherein the primary database is further configured to:

when a modification request for the first table is received, modify local data of the first table according to the modification request, and synchronize a corresponding modification log to each standby database, so that each standby database separately modifies the local data of the first table according to the modification log.

9. The system according to claim 7, wherein the system comprises a plurality of clusters each of which has a corresponding write success threshold, and the primary database is further configured to:

when a modification request for the first table is received, send, to each standby database, a modification log of the first table corresponding to the modification request, and receive a response message for the modification log; and when the received response message indicates that a quantity of copies, in each cluster, capable of modifying local data of the first table according to the modification log meets the write success threshold of respective cluster, return a modification instruction to each copy capable of modifying the local data of the first table according to the modification log, to trigger the each copy to complete modification.

10. The system according to claim 7, wherein the primary database and/or the standby database are/is further configured to:

when it is determined that the auxiliary node is abnormal, initiate a distributed election for the auxiliary node, and mark a running state of the auxiliary node as offline when a quantity of approval votes for the election exceeds half.

11. The system according to claim 7, wherein the first table is any table or a predefined specific table.

12. A primary database election method, applied to the auxiliary node and/or any cluster in the database system according to claim 1, the method comprising:

upon determining that any cluster is a primary database of a first table and the other clusters are standby databases, initiating a distributed election for the primary database of the first table among the auxiliary node and clusters when it is determined that the auxiliary node and the clusters do not record the primary database of the first table in term; and electing a cluster that obtains more than half of approval votes as a new primary database.

* * * * *